(12) United States Patent
Marz et al.

(10) Patent No.: US 9,314,062 B2
(45) Date of Patent: Apr. 19, 2016

(54) SHOCK ABSORBING LAYER WITH INDEPENDENT ELEMENTS, AND PROTECTIVE HELMET INCLUDING SAME

(75) Inventors: Michael Marz, Laval (CA); Jeffrey Dalzell, Pierrefonds (CA)

(73) Assignee: CORTEX ARMOUR INC., Pointe-Claire (CA)

( * ) Notice: Subject to any disclaimer, the term of this patent is extended or adjusted under 35 U.S.C. 154(b) by 0 days.

(21) Appl. No.: 13/877,734

(22) PCT Filed: Aug. 1, 2011

(86) PCT No.: PCT/CA2011/050472
§ 371 (c)(1),
(2), (4) Date: Sep. 23, 2013

(87) PCT Pub. No.: WO2012/045169
PCT Pub. Date: Apr. 12, 2012

(65) Prior Publication Data
US 2014/0007322 A1    Jan. 9, 2014

Related U.S. Application Data

(60) Provisional application No. 61/390,244, filed on Oct. 6, 2010.

(51) Int. Cl.
*A42B 3/12*    (2006.01)
*A42B 3/06*    (2006.01)
(Continued)

(52) U.S. Cl.
CPC . *A42B 3/12* (2013.01); *A42B 3/065* (2013.01); *B32B 3/10* (2013.01); *F16F 3/0876* (2013.01); *F41H 1/04* (2013.01); *Y10T 428/24479* (2015.01); *Y10T 428/24802* (2015.01)

(58) Field of Classification Search
CPC .......... A42B 3/125; A42B 3/064; A42B 3/12; A42B 3/121; A42B 3/00; A41D 13/015; A63B 71/10
USPC .............................................. 2/410–414, 425
See application file for complete search history.

(56) References Cited

U.S. PATENT DOCUMENTS 3,156,459 A    11/1964    Mason
3,633,228 A    1/1972    Zysman
(Continued)

FOREIGN PATENT DOCUMENTS

CA    1207951    7/1986
CA    2028460    4/1991
(Continued)

*Primary Examiner* — Andrew W Collins
(74) *Attorney, Agent, or Firm* — Norton Rose Fulbright Canada LLP (57) ABSTRACT

The present shock absorbing layer for a helmet includes a base plate and a plurality of spaced apart, independently and elastically collapsible, shock absorbing members. These hollow shock absorbing members define a closed perimeter wall extending upwardly from the base plate to an open top end sized to cause negligible reduction of fluid flow exiting the shock absorbing member. The closed perimeter wall includes a first portion with opposed inner and outer surfaces each having the shape of a frustum, and a second portion with opposed inner and outer surfaces each also having the shape of a frustum. These inner surfaces are interconnected through relatively radially wider ends of their respective frustums to define an inner angle therebetween of less than 180 degrees. These outer surfaces are interconnected through relatively radially wider ends of their respective frustums to define an outer angle therebetween of greater than 180 degrees.

26 Claims, 11 Drawing Sheets

(51) Int. Cl.
*F16F 3/087* (2006.01)
*F41H 1/04* (2006.01)
*B32B 3/10* (2006.01)

(56) References Cited

U.S. PATENT DOCUMENTS

| | | | |
|---|---|---|---|
| 3,679,166 A | 7/1972 | Sturhan | |
| 3,806,106 A | 4/1974 | Hamel et al. | |
| 3,877,076 A | 4/1975 | Summers et al. | |
| 4,005,858 A * | 2/1977 | Lochner | 267/136 |
| 4,194,255 A | 3/1980 | Poppe | |
| 4,213,202 A * | 7/1980 | Larry | 2/456 |
| 5,204,998 A | 4/1993 | Liu | |
| 5,853,844 A | 12/1998 | Wen | |
| 6,533,258 B2 | 3/2003 | Monson et al. | |
| 6,567,993 B2 * | 5/2003 | Robertson | 2/411 |
| 6,749,187 B2 | 6/2004 | Yang | |
| 6,777,062 B2 | 8/2004 | Skaja | |
| 7,033,666 B2 | 4/2006 | Skaja | |
| D521,191 S | 5/2006 | Berger | |
| D570,055 S | 5/2008 | Ferrara et al. | |
| D582,607 S | 12/2008 | Ferrara et al. | |
| D584,456 S | 1/2009 | Ferrara | |
| 7,574,760 B2 | 8/2009 | Foley et al. | |
| D603,103 S | 10/2009 | Ferrara et al. | |
| 7,673,351 B2 | 3/2010 | Copeland et al. | |
| 7,676,854 B2 | 3/2010 | Berger et al. | |
| 7,677,538 B2 | 3/2010 | Darnell et al. | |
| 7,695,069 B2 | 4/2010 | Prust | |
| 7,774,866 B2 | 8/2010 | Ferrara | |
| 7,895,681 B2 | 3/2011 | Ferrara | |
| 8,814,150 B2 * | 8/2014 | Ferrara et al. | 267/139 |
| 2006/0059605 A1 | 3/2006 | Ferrara | |
| 2006/0059606 A1 | 3/2006 | Ferrara | |
| 2006/0070170 A1 | 4/2006 | Copeland et al. | |
| 2007/0083965 A1 | 4/2007 | Darnell et al. | |
| 2007/0190292 A1 * | 8/2007 | Ferrara | 428/166 |
| 2007/0190293 A1 | 8/2007 | Ferrara | |
| 2007/0199136 A1 | 8/2007 | Brine, III et al. | |
| 2008/0155735 A1 | 7/2008 | Ferrara | |
| 2008/0256686 A1 | 10/2008 | Ferrara | |
| 2009/0038055 A1 | 2/2009 | Ferrara | |
| 2009/0051089 A1 | 2/2009 | Kirchner et al. | |
| 2009/0178184 A1 | 7/2009 | Brine, III et al. | |
| 2010/0186150 A1 | 7/2010 | Ferrara et al. | |
| 2010/0258988 A1 | 10/2010 | Darnell et al. | |
| 2010/0299812 A1 | 12/2010 | Maddux et al. | |
| 2011/0047678 A1 | 3/2011 | Barth et al. | |

FOREIGN PATENT DOCUMENTS

| | | |
|---|---|---|
| CN | 1116913 | 2/1996 |
| JP | 2007254920 | 10/2007 |
| WO | 2006088500 | 8/2006 |
| WO | 2009020583 | 2/2009 |

* cited by examiner

SHOCK ABSORBING LAYER WITH INDEPENDENT ELEMENTS, AND PROTECTIVE HELMET INCLUDING SAME

CROSS-REFERENCE TO RELATED APPLICATION

This is a national phase entry application filed under 35 USC 371 of International Application No. PCT/CA2011/050472 filed Aug. 1, 2011, which claims priority on U.S. provisional application No. 61/390,244 filed Oct. 6, 2010, the entire contents of both of which is incorporated by reference herein.

TECHNICAL FIELD

The present disclosure relates generally to a shock absorbing layer for protective helmets, and more particularly to such a layer containing multiple shock absorbing features designed to attenuate the energy of an impact and protect the helmet wearer from damage due to linear and angular accelerations caused during such an impact.

BACKGROUND

Helmets are often worn in sports or other physical activities to protect from injuries that can result from impact forces and/or accelerations to the brain. Helmets can be generally classified into two categories using different impact attenuation technology: single impact helmets and multiple impact helmets. Design constraints for any helmet typically include overall size, weight, aesthetic commercial ability of the concept, and compliance with all appropriate governing impact standards associated with the particular category of the helmet.

In single impact helmets such as typical cycling, alpine and motorcycle helmets, the shock absorbing elements usually undergo permanent deformation under impact. In multiple impact helmets such as typical hockey, lacrosse, and football helmets, the shock absorbing elements are designed to withstand multiple impacts with little to no permanent deformation.

Some multiple impact helmets use either vinyl nitrile (VN) or expanded polypropylene (EPP) material. These materials can exhibit performance degradation after multiple impacts due to slight plastic deformation after each impact, which may cause a reduction in the material thickness in the impact zone thus an increase in material density, which makes the material harder and may result in reduced energy management.

Other known multiple impact helmets include a shock absorbing layer of compressible cells containing a fluid, for example air, the cells being closed except for a small passageway allowing the fluid to escape when the cell is compressed. The structure of the cell is typically such as to resist compression at the initial phase of the impact, the passageway having a choking effect on the fluid moving at high velocity; the cell then progressively compresses as the fluid is slowly vented out through the passageway. Such a mechanism however requires the individual cells to have a relatively large size, in order for the volume of fluid contained therewithin to have an effect on the cell's resistance to impact. The use of larger cells may prevent optimized coverage of the shock absorbing layer within the helmet, thus hindering achievement of proper all around protection Due to insufficient measuring techniques at the time, it was commonly viewed in previous research that linear and angular accelerations strongly correlated with respect to head injury criteria during impacts; this lead scientists to only focus on linear accelerations to determine head injury thresholds, as it was the easier of the two accelerations to measure. As such, helmet standards to date currently only measure linear accelerations as their pass/fail criteria, with no mention of angular accelerations.

New research evidence seems to indicate that angular accelerations can vary significantly from linear accelerations under certain impact conditions, and potentially can even solicit greater forces therefore causing more damage and injury if not managed appropriately. For example, angular accelerations can be significant and even predominant when an impact is received off of the center of mass thus causing a greater degree of rotation, a scenario which is very likely to occur in all sporting activities where a helmet is needed for protection.

Generally speaking, as the density, stiffness, and thickness or height of the shock absorbing elements are varied, proportional linear impact management characteristics are obtained. However, typical known shock absorbing elements provide little angular acceleration impact attenuation.

For example, one type of known impact technology uses a plurality of shock absorbing members interconnected with webbing. The webbing typically allows for loads to be transmitted between the members, thus restricting lateral displacement during collapse of the interconnected members. The webbing also increases the resistance to bending of the tubular members, and as such may prevent adequate angular acceleration impact attenuation.

Accordingly, improvements are desirable.

SUMMARY

It is therefore an aim of the present invention to provide an improved shock absorbing layer, particularly suitable for use in multiple impact helmets but also suitable for use in other helmets and/or other types of sports equipment.

Therefore, in accordance with the present invention, there is provided a shock absorbing layer for a helmet, the layer comprising: a base plate; and a plurality of spaced apart shock absorbing members disposed on the base plate and interconnected only therethrough, each of the shock absorbing members being independently and elastically collapsible to at least partially absorb an impact load on the helmet, the shock absorbing members being hollow and defining a closed perimeter wall extending upwardly from the base plate to an open top end sized to cause negligible reduction of fluid flow exiting the shock absorbing member, the closed perimeter wall of each said shock absorbing member including at least one wall section, each wall section having: a first portion having opposed inner and outer surfaces each having the shape of a frustum, and a second portion extending upwardly from the first portion and being integrally formed therewith, the second portion having opposed inner and outer surfaces each having the shape of a frustum, wherein the inner surfaces of the first and second portions are interconnected through relatively radially wider ends of their respective frustums to define an inner angle between the inner surfaces of the first and second portions of less than 180 degrees, and the outer surfaces of the first and second portions are interconnected through relatively radially wider ends of their respective frustums to define an outer angle between the outer surfaces of the first and second portions of greater than 180 degrees.

Also in accordance with the present invention, there is provided a shock absorbing layer for a helmet, the shock absorbing layer comprising: a base plate; a plurality of spaced apart and independently collapsible primary shock absorbing members being hollow and having a closed perimeter wall extending from the base plate to an open top end, the closed perimeter wall defining at least one wall section having a radially outwardly bent shape which forms a diverging-converging wall profile defining radially narrower upper and lower ends and a radially wider center portion, the radially wider center portion of the wall section forming a maximum width of the primary shock absorbing member disposed at a location between the open top end thereof and the base plate; and a secondary shock absorbing member extending from the base plate within the closed perimeter wall of each said primary shock absorbing member and acting independently from the primary shock absorbing member.

Further in accordance with the present invention, there is provided a protective helmet comprising: an outer shell; and a shock absorbing layer including a base plate and a plurality of spaced apart and independently acting hollow shock absorbing members which are elastically collapsible to at least partially absorb an impact load on the helmet, shock absorbing members extending from an outer surface of the base plate and interconnected only through the base plate, said shock absorbing members having an open top end located adjacent an inner surface of the outer shell and sized to cause negligible reduction of flow of fluid exiting the hollow member, the shock absorbing members including a closed perimeter wall having at least one wall section, each said wall section having a first portion with opposed inner and outer surfaces each having the shape of a frustum, a second portion extending upwardly from the first portion having opposed inner and outer surfaces each having the shape of a frustum, and wherein the inner surfaces of the first and second portions are interconnected through relatively larger ends of their respective frustums, and the outer surfaces of the first and second portions being interconnected through relatively larger ends of their respective frustums.

There is also provided a protective helmet as described above, wherein the inner surfaces of the first and second portions define an inner angle therebetween of less than 180 degrees, and the outer surfaces of the first and second portions define an outer angle therebetween of greater than 180 degrees.

There is also provided a protective helmet as described above, further comprising a cushioning layer disposed adjacent an inner surface of the base plate.

There is also provided a protective helmet as described above, wherein each of the shock absorbing members has a single section with the first portion extending from the base plate and the second portion defining the open top end.

There is also provided a protective helmet as described above, wherein each member has at least two of said sections, with a first one of the sections extending from the base plate and a second one of the sections extending upwardly from the first one of the sections and defining the open top end, and wherein adjacent ones of the inner surfaces of the first and second sections being interconnected through relatively smaller ends of the respective frustum, and adjacent ones of the outer surfaces of the first and second sections being interconnected through relatively smaller ends of the respective frustum.

There is also provided a protective helmet as described above, wherein the inner and outer surfaces of the wall section of said shock absorbing members have a frusto-conical shape.

There is also provided a protective helmet as described above, wherein each of the shock absorbing members is a primary shock absorbing member, and a secondary shock absorbing member independently extends upwardly from the base plate and is disposed within the closed perimeter wall of each said primary shock absorbing member, the secondary shock absorbing members acting independently from the primary shock absorbing member.

There is also provided a protective helmet as described above, wherein the secondary member is hollow and has a circular cross-section.

There is also provided a protective helmet as described above, wherein the secondary shock absorbing members has a smaller height away from the base plate than that of the primary shock absorbing members.

There is also provided a protective helmet as described above, wherein the outer surfaces of the first and second portions and the inner surfaces of the first and second portions are relatively oriented such that the member includes a continuous tubular portion of material extending from the base plate to the open end when the shock absorbing member is uncompressed.

BRIEF DESCRIPTION OF THE DRAWINGS

Reference will now be made to the accompanying drawings, showing by way of illustration a particular embodiment of the present invention and in which.

DETAILED DESCRIPTION

Figure 1:
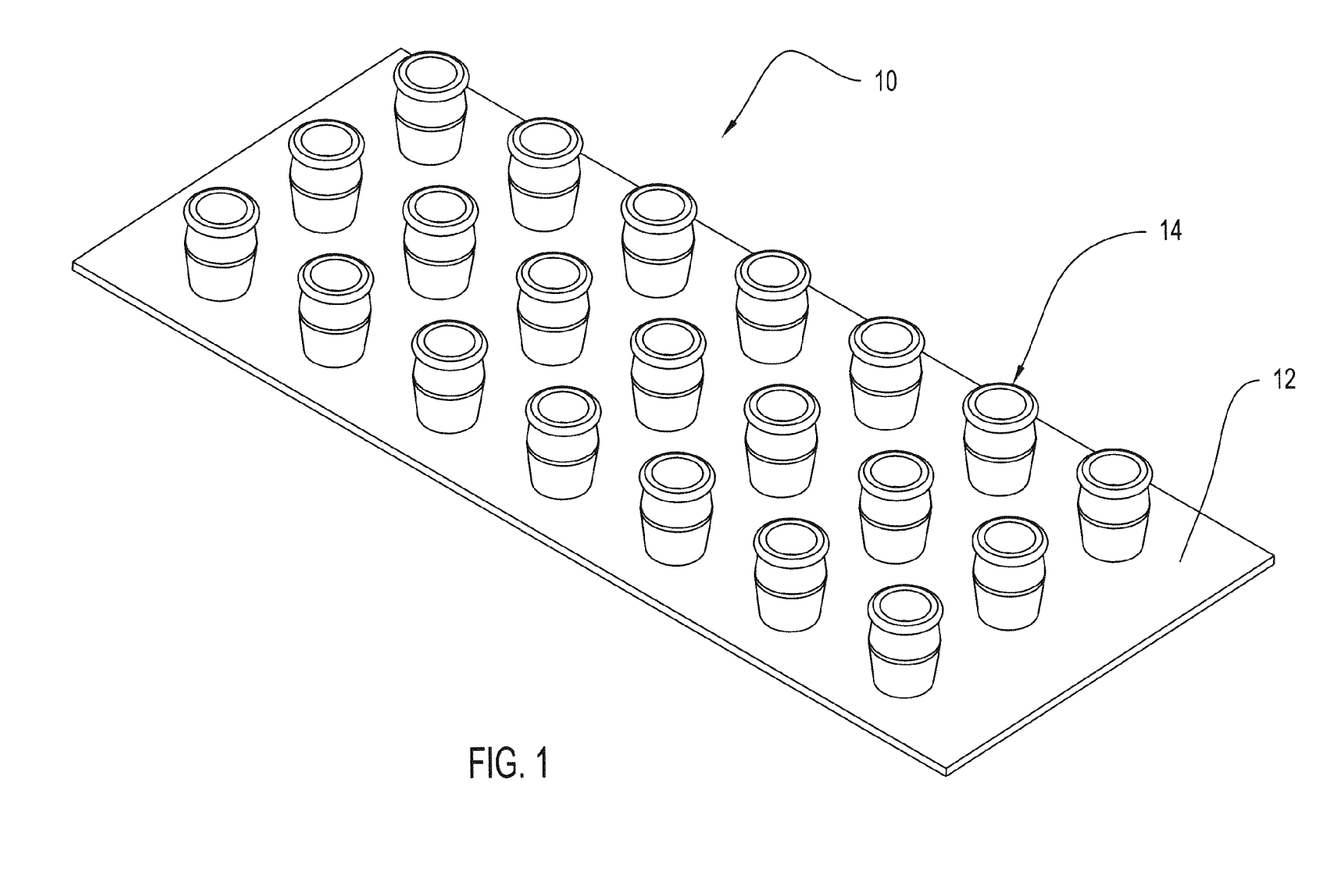
FIG. 1 is a perspective view of a shock absorbing layer according to a particular embodiment.
Figure 9:
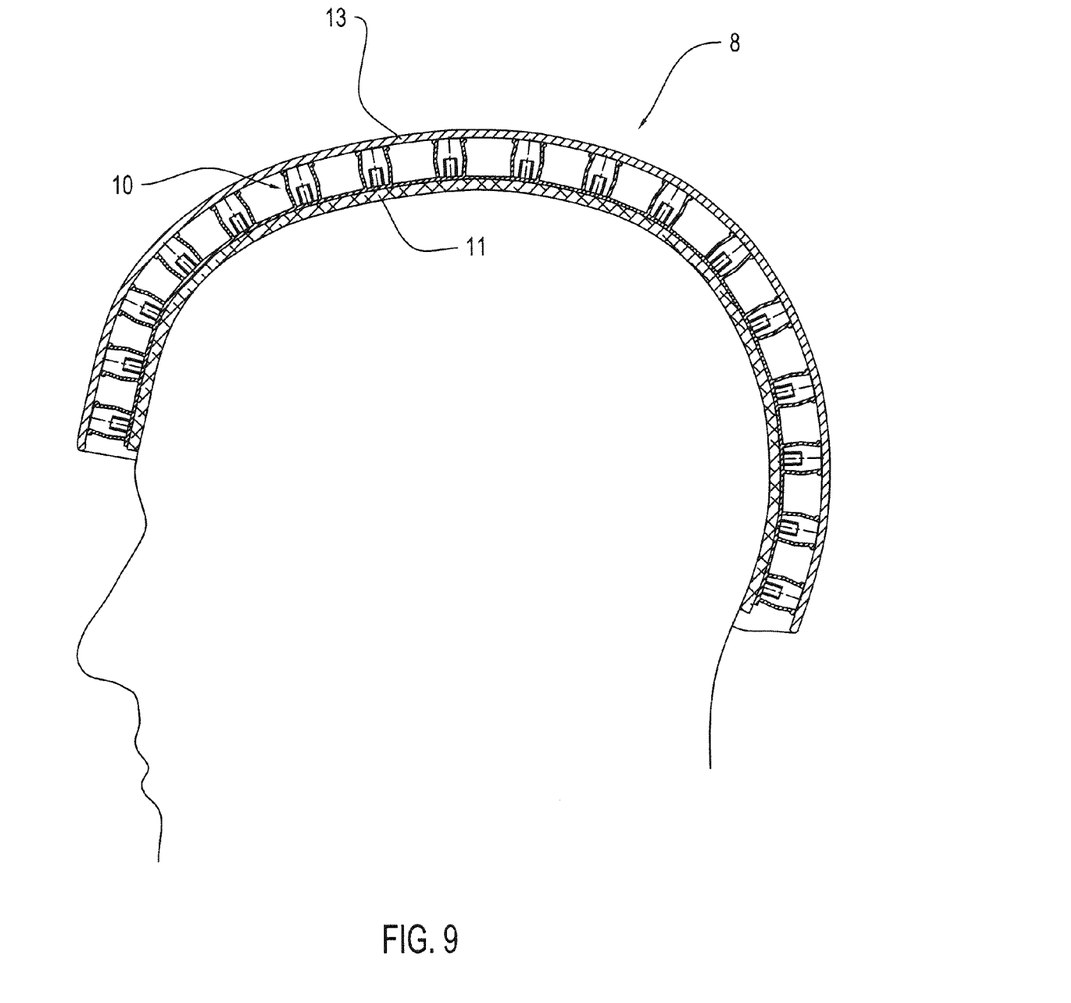
FIG. 9 is a schematic side cross-sectional view of a helmet incorporating the shock absorbing layer of FIG. 1.

Referring now to FIG. 1, a shock absorbing layer 10 of one embodiment of the present disclosure is shown. As schematically shown in FIG. 9, the shock absorbing layer 10 is designed for use as a part of the internal structure of a protective helmet 8, such as one used for sports, such as a hockey, lacrosse, football, motor sports, snow-sports, motorcycling and/or bicycling for example. The helmet 8 may be a multiple impact helmet, or a single impact helmet. Alternately, however, the helmet 8 having the shock absorbing layer 10 may be used for other sports categories or for non-sports applications, such as a protective helmet or "hard hat" used in construction for example.

The shock absorbing layer 10 of the helmet 8 may be sandwiched between an inner cushioning layer 11, made of foam material for example, and the helmet's rigid outer shell 13, which can be made of a hard plastic, although a number of other protective, decorative or comfort-enhancing layers or elements may additionally be provided. Although the cushioning layer 11 is shown as being continuous, it can alternately be provided in a plurality of pieces which abut each other, are spaced apart from each other, overlap each other or any combination of these. Although the outer shell 13 is shown as being continuous, it can alternately be provided in two or more pieces, for example by having a front and rear shell portions slidably engaged to one another for size adjustment. The shock absorbing layer 10 may also be provided in a plurality of cooperating pieces, as will be further detailed below. Other helmet configurations are also possible.

Referring back to FIG. 1, the shock absorbing layer 10 includes a base plate 12, and a plurality of independent, or independently collapsible, shock absorbing elements 14 extending therefrom. Although not shown, the base plate 12 can include holes, openings, slots, etc. defined therethrough in non-critical areas for weight reduction purposes, for example between adjacent shock absorbing elements. The shock absorbing elements allow managing of helmet impact attenuation by attenuating both linear and angular accelerations, as will be further detailed below.

In a particular embodiment, the shock absorbing elements 14 are injection molded directly onto the base plate 12. Alternately the elements 14 may be molded separately from the base plate 12 and attached thereto through any adequate process, for example using welding or adhesive. In a particular embodiment, the base plate 12 and shock absorbing elements 14 are made of an adequate type of thermoplastic elastomer (TPE), such as, but not limited to, a polyurethane elastomer (TPU), a copolyamide (TPA), a copolyester (TPC), a polyolefin elastomer (TPO) or a polystyrene thermoplastic elastomer (TPS). Adequate materials that may be used preferably provide excellent flexibility even at low temperatures, good wear resistance, high elasticity with sufficient mechanical strength, and are preferably injection moldable.

The base plate 12 functions as an anchor point for the plurality of shock absorbing elements 14. The base plate 12 also becomes a part of the internal helmet structure. A complete system for a helmet includes a plurality of molded base plates 12, designed, shaped and optimized for specific applications. The shock absorbing layer 10 of FIG. 1 is shown as an exemplary illustration; the geometry of the base plate(s) as well as the quantity and location of the shock absorbing elements on each base plate are dependent on the application. In the embodiment shown, the elements 14 are aligned in identical rows and in identical columns extending perpendicularly to the rows. Alternate arrangements are also possible, for example in rows and/or columns having a different number of elements from one another, in rows extending at an angle different than the perpendicular from the columns, distributed in an irregular manner, offset from each other, etc. For example, in a particular embodiment which is not shown, the shock absorbing layer includes rows of 3 elements which alternate with rows of 2 elements.

Figure 2:
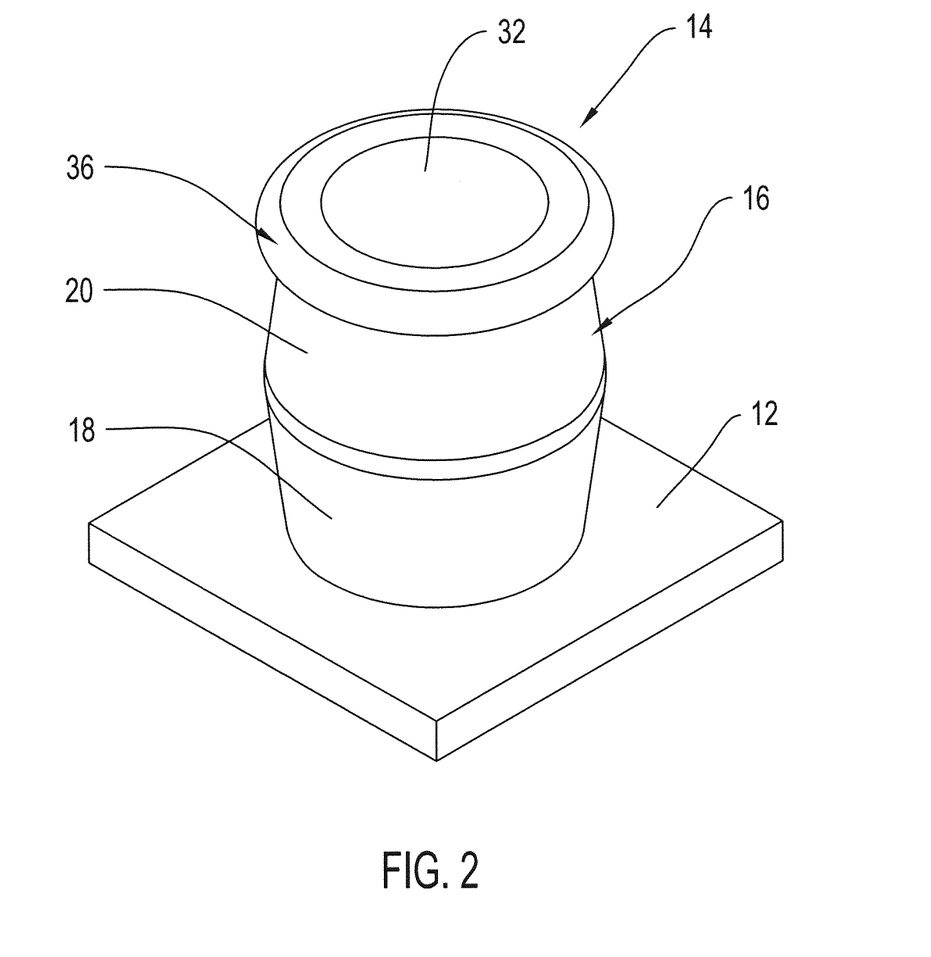
FIG. 2 is a perspective view of a shock absorbing element of the layer of FIG. 1.
Figure 3:
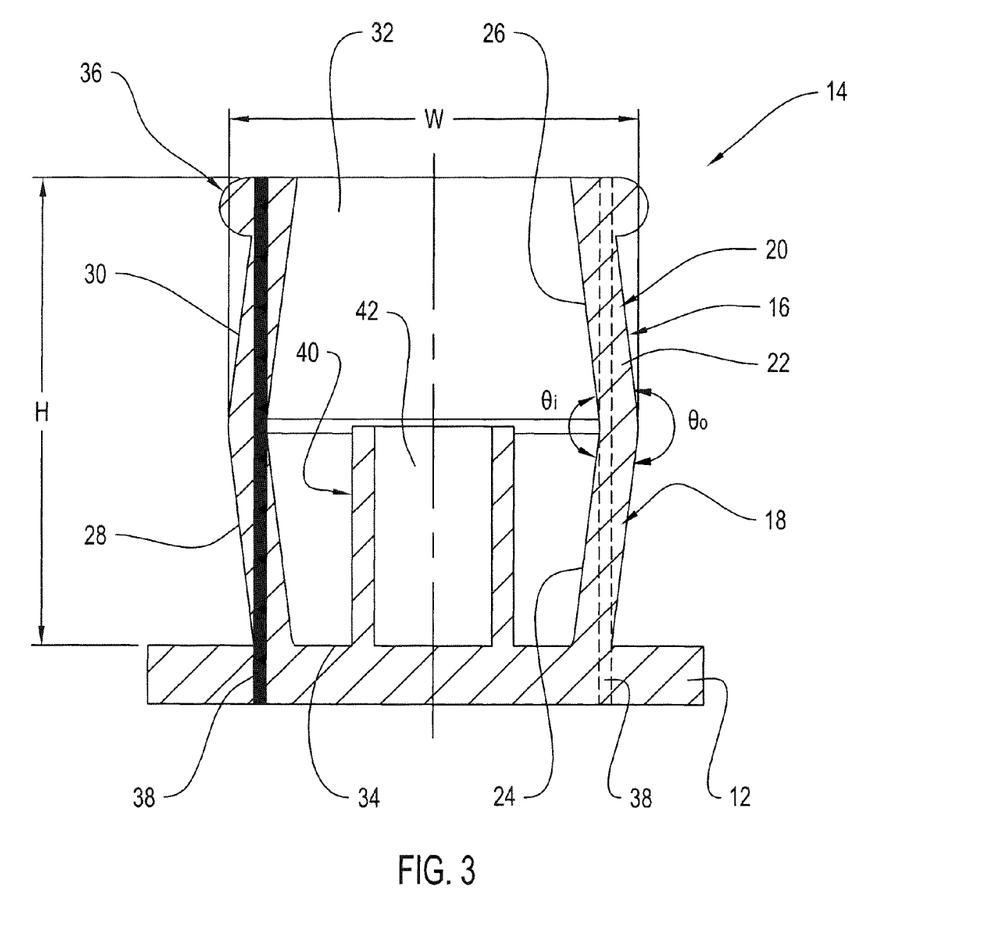
FIG. 3 is a side cross-sectional view of the element of FIG. 2.
Figure 8:
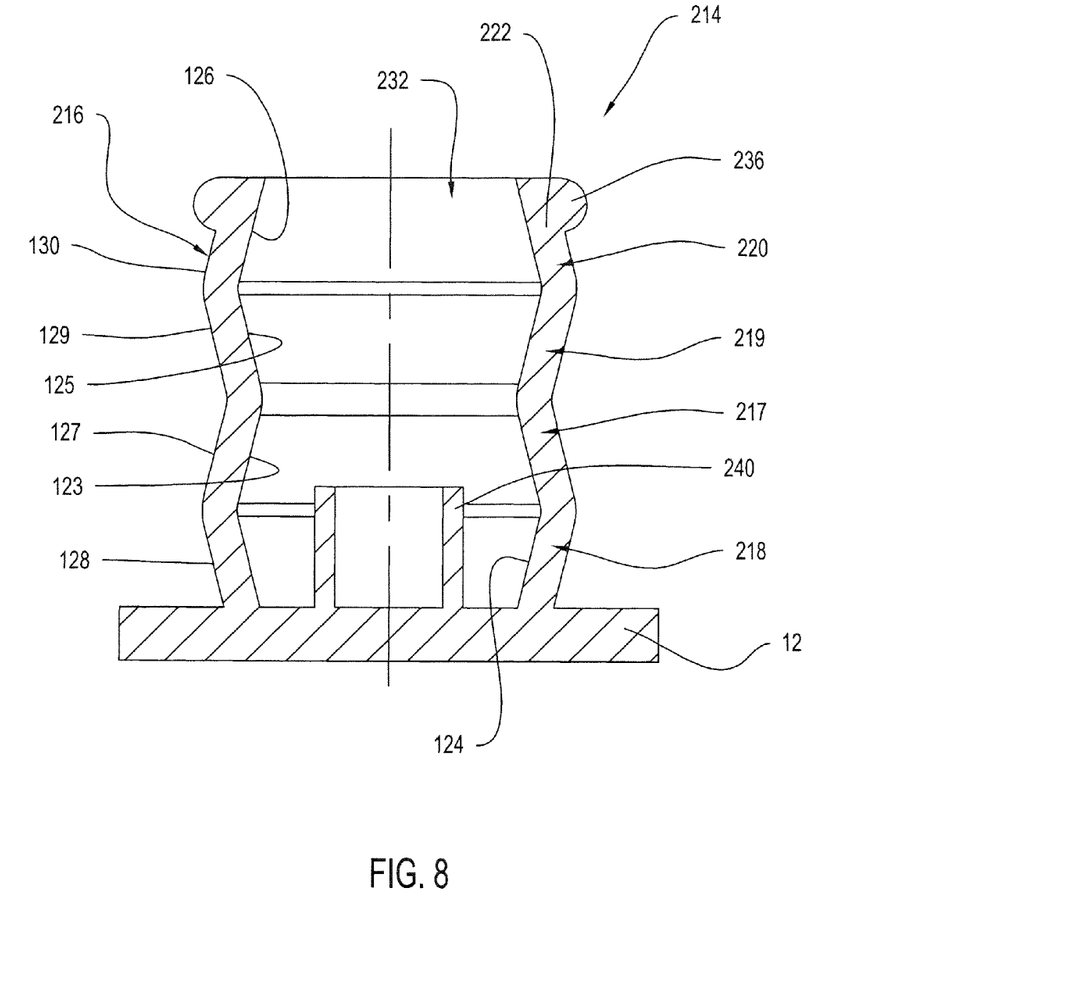
FIG. 8 is a side cross-sectional view of a shock absorbing element according to a further embodiment.

Referring to FIGS. 2-3, the shock absorbing elements 14 are independent from one another, i.e. they are interconnected only through the base plate 12. Each shock absorbing element 14 includes a hollow primary shock absorbing member 16 which is configured to elastically deflect when sufficient load is applied. The hollow primary shock absorbing member 16 has a closed perimeter wall extending upwardly from the base plate to an open top end sized to cause negligible reduction of fluid flow exiting the shock absorbing member. The closed perimeter wall of each shock absorbing member includes at least one wall section, each wall section having a radially outwardly bent shape and thus defining a "diamond" or barrel shaped outer periphery, i.e. one which is diverging-converging to define radially narrower upper and lower ends of the wall section and a radially wider center portion, as shown in FIG. 3 for example. Several of such sections may be integrally formed and vertically stacked, such as to form a bellow-like construction, as shown in FIG. 8 and as will be described in further detail below. The hollow primary shock absorbing member 16 of FIG. 3 has a bottom portion 18 extending from the base plate 12 and a top portion 20 extending from the bottom portion 18. Each portion 18, 20 has a closed perimeter formed by one or more walls 22. The bottom and top portions 18, 20 have inner and outer surfaces 24, 26, 28, 30 each having the shape of a right frustum, i.e. the shape of a portion of cone or pyramid which lies between two parallel planes extending perpendicularly to its axis. In the embodiment shown, the inner and outer surfaces 24, 26, 28, 30 of both the bottom and top portions 18, 20 have a frusto-conical shape, i.e. have a circular cross-section, thus each of the bottom and top portions includes a single wall defining its closed perimeter. Alternate frustum shapes are also possible, i.e. with cross-sections having a non-circular shape.

The relatively larger (i.e. radially wider) end of the frustum of the inner surface 26 of the top portion 20 is connected to the relatively larger (i.e. radially wider) end of the frustum of the inner surface 24 of the bottom portion 18; similarly, the relatively larger end of the frustum of the outer surface 30 of the top portion 20 is connected to the relatively larger end of the frustum of the outer surface 28 of the bottom portion 18. As such, the wall 22 of the primary member 16 has a radially outwardly flared or bent shape which forms a diamond-shaped profile. In the embodiment shown, the wall 22 of the primary member 16 has a constant thickness; the angle $\theta_i$ between the inner surfaces 24, 26 of the two portions 18, 20 and the angle $\theta_o$ between the outer surfaces 28, 30 of the two portions 18, 20 are conjugate angles, i.e. their sum is 360°, and $\theta_i < 180°$ and $\theta_o > 180°$. Alternately, the thickness of the wall 22 can vary across the height of the primary member 16, such that the two angles $\theta_i$, $\theta_o$ are not conjugate angles, while still having $\theta_i < 180°$ and $\theta_o > 180°$. Although the bottom and top portions 18, 20 are shown as having similar heights, alternately their heights can be different, such that the connection between the frustums is not located at the equidistance point of the height of the primary member 16.

The base plate 12 provides for the primary member 16 to have a closed bottom end 34, and the top portion 20 defines an open top end 32 which is sized to cause a negligible reduction of the flow of the fluid (e.g. air) exiting the primary member 16 upon compression. In the present specification and claims, "negligible reduction of the flow" also includes a configuration where no flow reduction at all is present. Therefore the fluid is free, or substantially free, to exit the primary member 16 when it is compressed. The shock absorbing element 14 thus does not rely on the fluid contained therewithin for impact management.

In a particular embodiment, the ratio between the height H of the primary member 16 and its maximum width W, defined at the connection between the bottom and top portions 18, 20, is at least 1, i.e. the height H is at least equal to the maximum width W. In the embodiment shown, the height to maximum width (or maximum diameter since the bottom and top portions 18, 20 are frusto-conical) ratio H/W is approximately 1.28.

Under axial loading, the radially outwardly bended shape of the wall(s) 22 defining the closed perimeter of the primary member 16 allows it to collapse in a controlled manner after its critical load has been exceeded. In an uncontrolled buckling scenario, with an axial load exerted on a cylinder and using an elastic material that will not fail under impact, the material is typically forced to collapse onto itself; uncontrolled collapse usually results in loss of effective impact attenuation stiffness, and may produce undesired permanent deformation of the cylinder. The primary member 16, instead of collapsing onto itself during impact, expands radially outwardly to avoid material compression. This expansion optimizes impact management attenuation control, by resulting in greater impact management consistency as well as increased collapsibility of the primary member. The thickness of the wall(s) 22 is selected to provide a desired level of resistance to linear loads. The distance between adjacent ones of the shock absorbing elements 14 on the base plate 12 is thus selected such as to avoid interaction or interference during this radial expansion caused by an impact.

Under a tangential load such as that caused by an angular acceleration, each primary member 16 is free to deform independently, since the elements 14 are not interconnected except through the base plate 12. An angular acceleration typically produces a tangential load at the top of member 16, and the members 16 each deflect similarly or substantially similarly to a cantilever beam that is loaded at its maximum distance from the beam's anchor point, which corresponds to the base plate 12.

The deflection y of a cantilever beam can be expressed as $$y = Fl^3/3EI$$

where F is the applied tangential load, l is the cantilever length, E the material's modulus of elasticity, and I the (second) moment of inertia. As such, the variables that influence the deflection or bending of the beam are its length l, which in the case of the member 16 corresponds to the height H, and the second moment of inertia I. Usually, the height H of the member 16 is determined by the ability for a helmet to pass a standardized impact test as well as the marketability of the helmet, since a larger sized helmet might not be commercially successful for esthetic reasons. As such, while the height H of the member 16 may be varied to achieve the desired deflection to absorb tangential impact, in most cases the property of the member 16 which becomes the primary variable for tangential impact absorption is the moment of inertia I. Thus, the shape of the member 16, the wall thickness and the height to maximum width ratio H/W are selected to obtain the moment of inertia I which provides a desired level of resistance to tangential loads. The distance between adjacent ones of the shock absorbing elements 14 on the base plate 12 is also selected such as to avoid interaction or interference during the deflection caused by tangential loads.

The shock absorbing element 14 thus allows management of angular accelerations by optimization of the height to maximum width ratio H/W and the wall thickness of the primary member 16, and management of linear accelerations by optimization of the wall thickness and wall angles of the primary member 16.

In the embodiment shown, the angles $\theta_i$, $\theta_o$ between the surfaces 24, 26, 28, 30 of the bottom and top portions 18, 20 are selected such that the wall 22 of the primary member 16 include a continuous tubular portion of material which extends throughout the full height of the primary member 16, schematically shown at 38 on FIG. 3, at least when the primary member 18 is un-compressed (i.e. in its natural or resting state). This tubular portion of material 38 (which is not distinct from the remainder of the wall 22) behaves like a thin-walled column under an axial load, and as such may provide initial impact load management until the critical buckling load for this column is reached. However, this continuous tubular portion of material 38 may not be present, i.e. a greater angle $\theta_o$ and a smaller angle $\theta_i$ may be used, in certain cases. This may include, but is not limited to, cases where the resistance required of the shock absorbing layer 10 is low enough and/or where the resistance of the material used for the primary member 16 is high enough.

In the embodiment shown, the shock absorbing element 14 further includes a brim 36 located around the open end 32 of the primary member 16, acting as a stiffening feature helping to prevent radially inward collapse of the wall(s) 22 when an axial and/or a tangential load is applied to the element 14. This stiffening feature permits the use of thinner wall structures for the purpose of design optimization and weight reduction; in cases where the thickness of the wall(s) 22 of the primary member 16 is sufficient to ensure controlled collapse, the brim 36 may be omitted. In the embodiment shown, the brim 36 is rounded and extends only radially outwardly from the wall 22 of the primary member 16. Alternately, the brim may extend only radially inwardly from the wall or both radially inwardly and outwardly therefrom, and may be of alternate shapes, for example defined by a tapering cross-section at the top of the wall 22. The brim 36 is shown as being continuous around the open end 32, but may alternately be formed of a plurality of angularly spaced apart sections. In the configurations where the brim extends radially inwardly, the brim is sized such as to cause a negligible reduction of the flow of the fluid exiting the primary member 16 through the open top end 32 upon compression.

Referring to FIG. 3, when an increased resistance to impact and management of multiple impact levels is required, the shock absorbing element 14 further includes a secondary shock absorbing member 40 extending from the base plate 12 within and at the center of each primary member 16. In a particular embodiment, the secondary member 40 is hollow and also injection molded directly onto the base plate 12, at the same time as the primary shock absorbing member 16, such that the layer 10 is monolithic. In the embodiment shown, the secondary member 40 is a tubular member having a cylindrical configuration and an open top end 42. In an alternate embodiment, the secondary shock absorbing member 40 also has two frustum-shaped portions, for example frusto-conical portions, having their relatively largest ends interconnected. In this case the profile of the secondary member 40 may mirror that of the primary member 16 (e.g. similar angles $\theta_i$, $\theta_o$). In another alternate embodiment, the secondary shock absorbing member 40 has a single frustum-shaped portion, for example a single frusto-conical portion, having its relatively smallest end connected to the base plate 12. In another alternate embodiment, the secondary shock absorbing member 40 has a bottom portion that is frusto-conical, with its relatively largest end connected to a cylindrical top portion. Secondary members 40 having cross-sections other than circular are also possible. The secondary members 40 do not necessarily need to be hollow; for example, the secondary members 40 may be full and made of an appropriate type of impact grade foam, for example vinyl nitril (VN) or expanded polypropylene (EPP) foam. The primary and secondary members 16, 40 are independent from one another, i.e. they are interconnected only through the base plate 12. In an alternate embodiment which is not shown, the primary and secondary members 16, 40 extend from the base plate 12 in a side by side manner instead of concentrically.

The height of the secondary member 40 is preferably at least 2 mm, and in the embodiment shown extends up to half of the height of the primary member 16. The secondary member 40 provides for management of high energy impacts after the wall 22 of the primary member 16 has begun to fail, such as to prevent bottoming out of the shock absorbing element 14, which could result in higher peak accelerations.

Referring to FIGS. 4-6 and 7A, a shock absorbing element 114 according to an alternate embodiment is shown. This embodiment may have improved independent tuning for angular and linear acceleration management with respect to the previously described embodiment. The independent shock absorbing elements 114 are provided on a base plate 12 similar to FIG. 1 and described above.

Like in the previous embodiment, the element 114 includes a hollow primary shock absorbing member 116 with a bottom portion 118 extending from the base plate 12 and a top portion 120 extending from the bottom portion 118 and defining an open top end 132 also sized to cause a negligible reduction of the flow of the fluid exiting the primary member 116 upon compression. Each portion 118, 120 has a closed perimeter formed by one or more walls 122. The relatively larger ends of the frustums of the bottom and top portion's inner surfaces 124, 126 are directly interconnected, and the relatively larger ends of the frustums of the bottom and top portion's outer surfaces 128, 130 are interconnected through an annular rib 144 extending around the perimeter. In an alternate embodiment, the annular rib 144 may be omitted. The element 114 also includes a secondary shock absorbing member 140 similar to the previously described secondary member 40. In an alternate embodiment, the secondary shock absorbing member 140 may be omitted.

Figure 4:
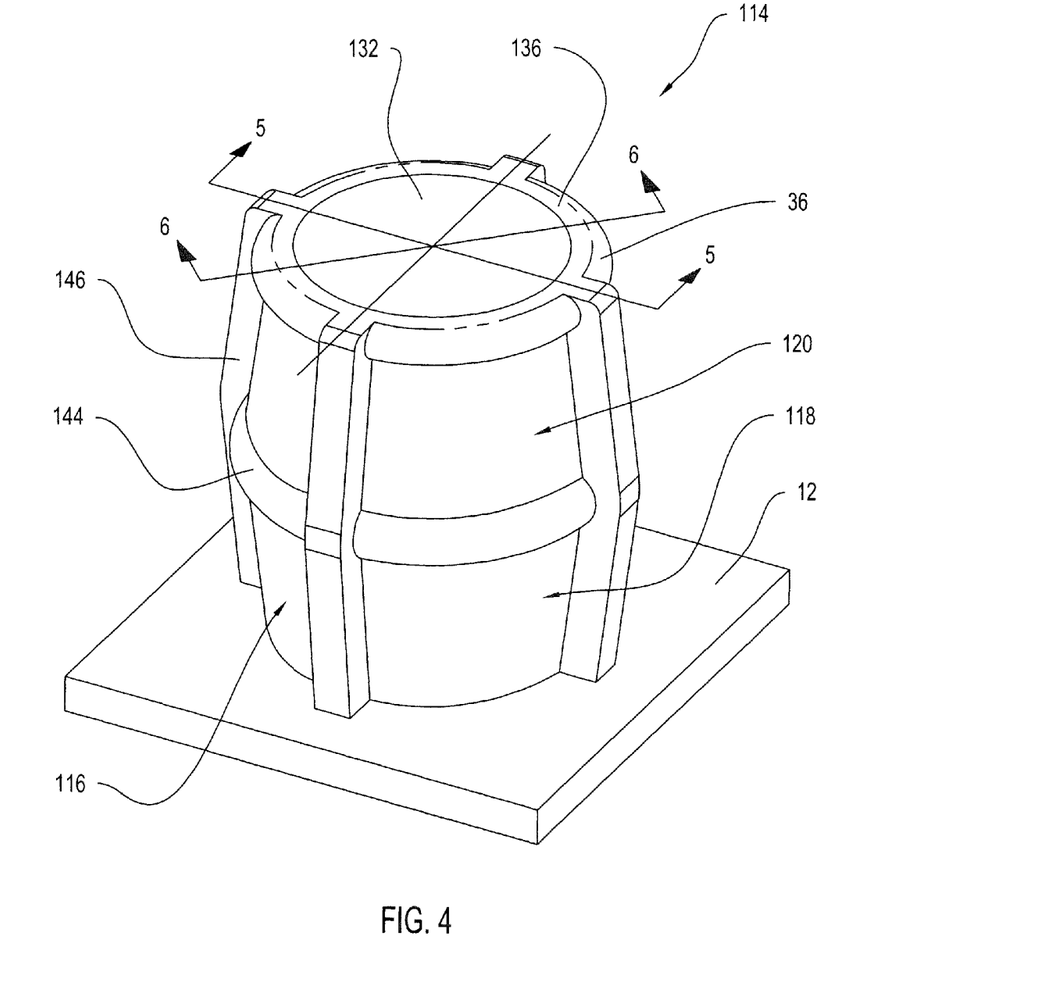
FIG. 4 is a perspective view of a shock absorbing element according to another embodiment.
Figure 5:
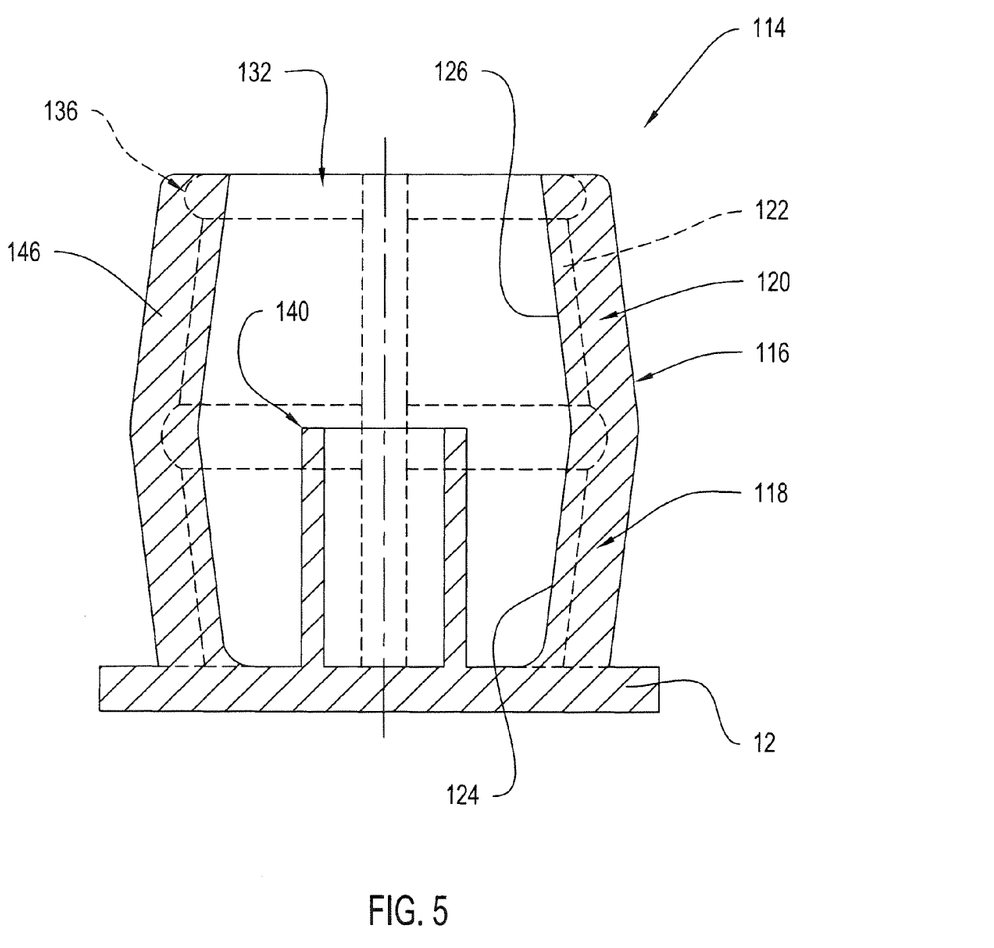
FIG. 5 is a side cross-sectional view of the element of FIG. 4, taken along lines 5-5.
Figure 6:
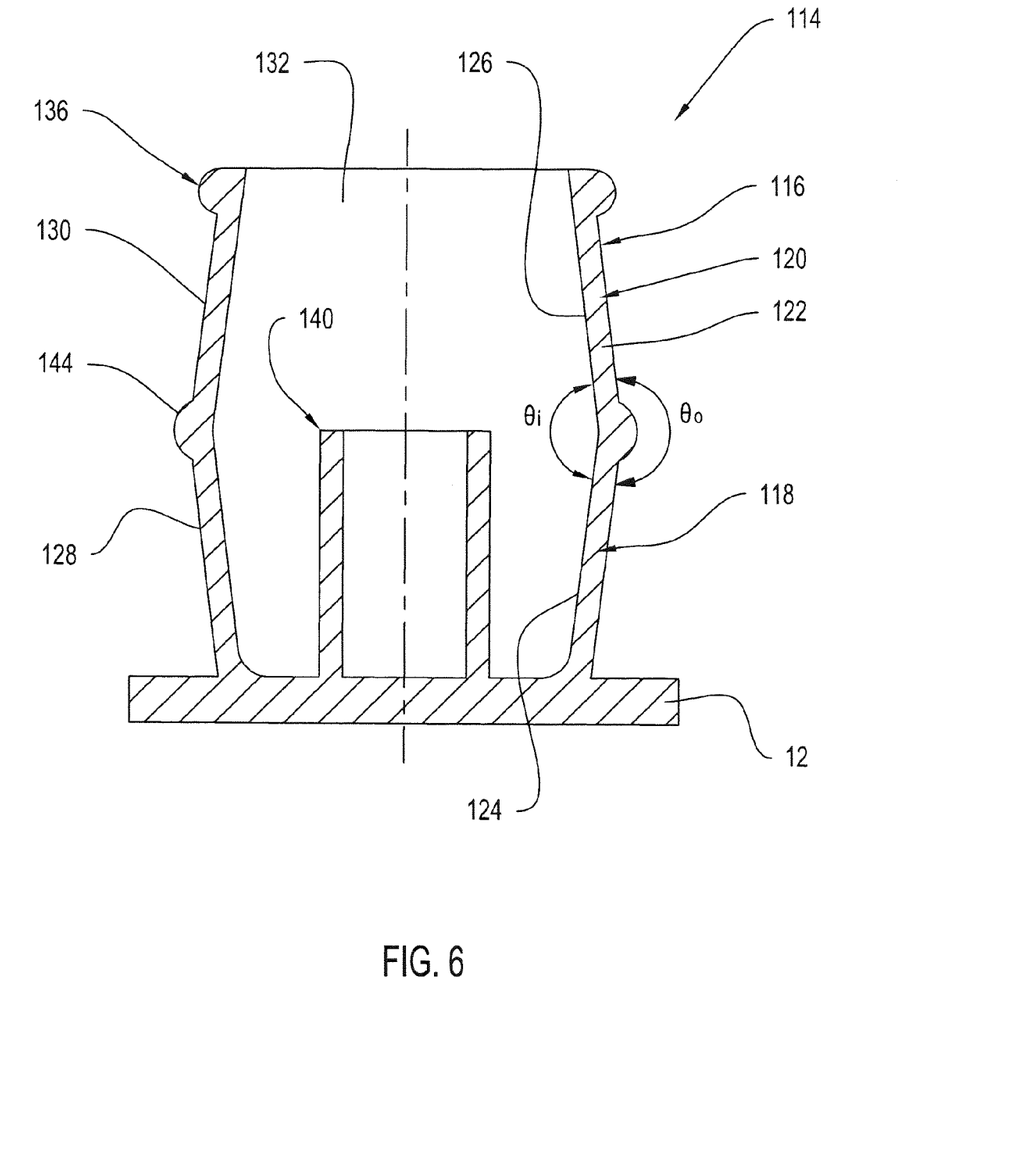
FIG. 6 is a side cross-sectional view of the element of FIG. 4, taken along lines 6-6.

In this embodiment, the shock absorbing element 114 further includes a plurality of vertically oriented ribs 146 which extend only radially outwardly from the wall 122 of the primary member 116, from the base plate 12 to the open top end 132. Although four ribs 146 are shown, alternate embodiments may include more or less ribs. In the embodiment shown, the ribs 146 follow the contour of the wall 122, i.e. they have a radially outwardly bent shape when viewed in a side cross-section of the element 114 (e.g. FIG. 5). Alternately, the ribs 146 may not follow the wall 122, i.e. they may be formed of two portions extending at an angle different from the angles $\theta_o$, $\theta_i$.

The annular rib 144 provides support to the vertically oriented ribs 146, and the brim 136 surrounding the open end 132 includes breaks at the location of the ribs 146. Alternately, the top end of the ribs 146 may be shaped such as to be integrated into a continuous brim.

Figure 7A:
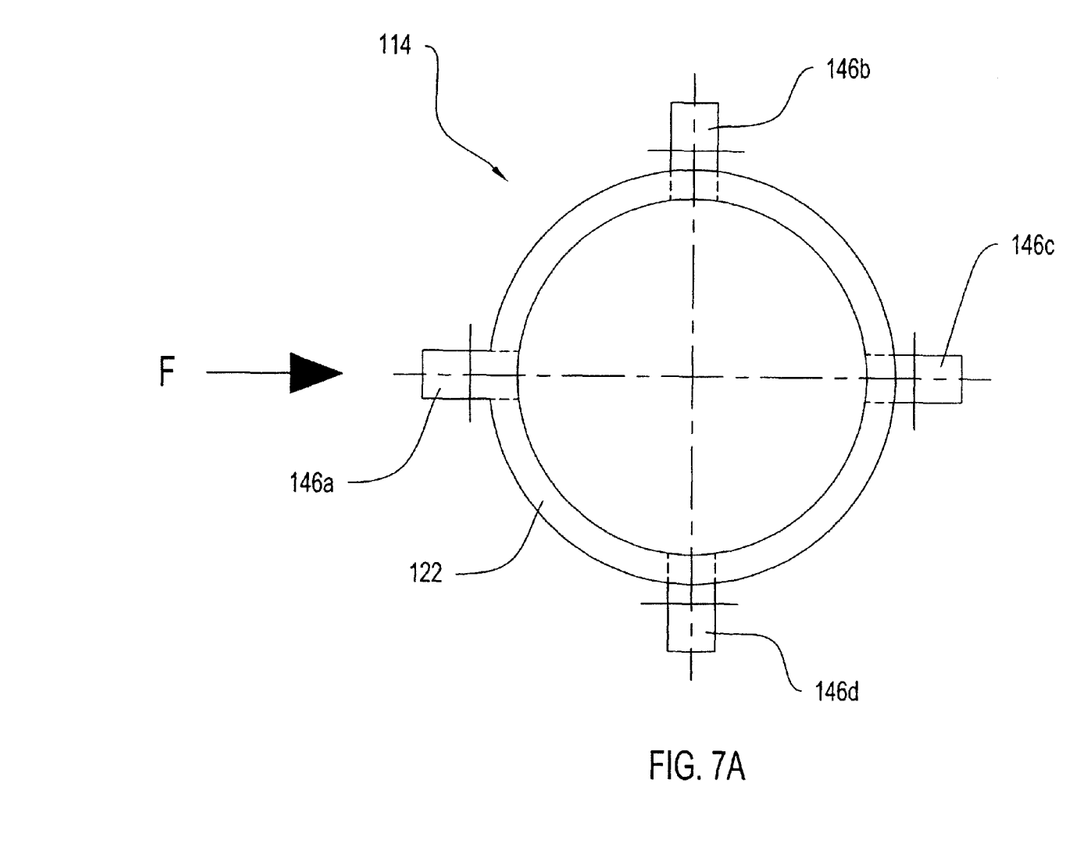
FIG. 7A is a schematic top cross-section of the elements of FIG. 4.
Figure 7B:
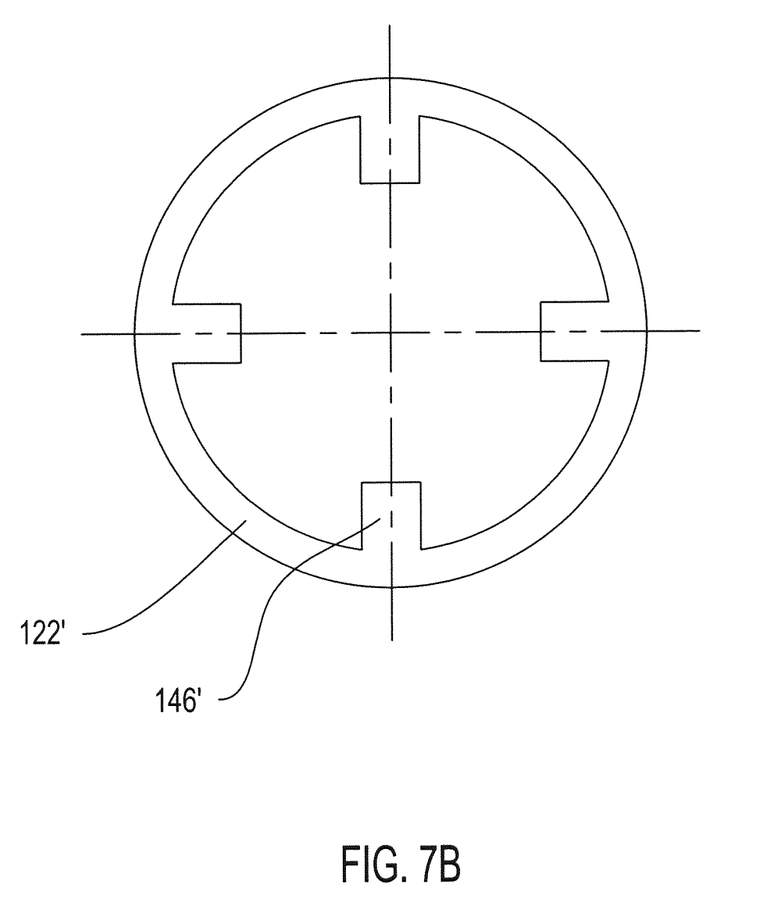
FIGS. 7B-7C are schematic top cross-sections of shock absorbing elements according to different embodiments.

In an alternate embodiment schematically shown in FIG. 7B, the ribs 146' extend only radially inwardly from the wall 122'. In another alternate embodiment schematically shown in FIG. 7C, the ribs 146" extend both radially inwardly and outwardly from the wall 122". The ribs 146, 146', 146" are designed to allow for a controlled outward expansion of the wall 122, 122', 122" during the compression of the primary member 116. The cross-section of the ribs 146, 146', 146" can be of any shape, as long as there is a difference in the effective second moments of inertia of the cross-section relative to the direction of the load causing the bending moment. As schematically depicted in FIG. 7A, when considering the tangential force F, the ribs 146a and 146c have the same second moment of inertia, and the ribs 146b and 146d have the same second moment of inertia, which is smaller than that of the ribs 146a and 146c. The ribs 146a and 146c are thus the primary rib contributors to management of the member bending or deflection under force F, due to their larger second moment of inertia. The varying effective moments of inertia of the ribs 146, 146', 146" allow for variable rib interaction and management of the bending moment on the member. The ribs 146, 146', 146", acting as beams, are more resistant to bending when oriented such that their second moment of inertia is the greatest.

Figure 7C:
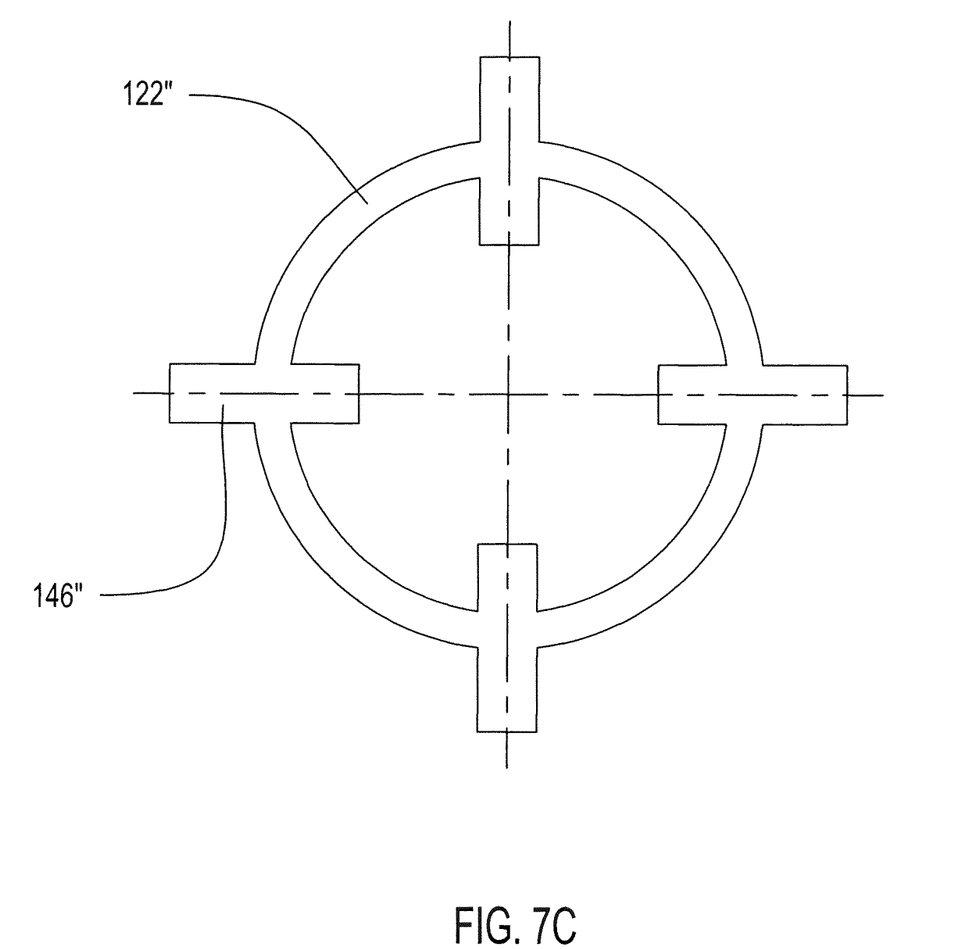

The presence of the ribs 146, 146', 146" may allow for improved management of angular accelerations, while still maintaining optimized management of linear accelerations. The management of angular accelerations is affected mainly by the sizing of the ribs 146, 146', 146", while the management of linear accelerations is affected by the thickness of the wall(s) 122, 122', 122" of the primary member 116 and radial thickness of the ribs 146, 146', 146"; as such, the axial loads and bending moments can be managed substantially independently, such that optimization of the shock absorbing element 114 for management of one particular type of loading (tangential or linear) has limited effect on how the element 114 is optimized to manage the other type.

Referring to FIG. 8, a shock absorbing element 214 according to an alternate embodiment is shown. The independent shock absorbing elements 214 are also provided on a base plate 12 similar to FIG. 1 and described above. Each element 214 includes a hollow primary shock absorbing member 216 and is shown here with a secondary shock absorbing member 240 similar to the previously described secondary member 40. In an alternate embodiment, the secondary shock absorbing member 240 may be omitted.

The primary shock absorbing member 216 has a bottom portion 218 extending from the base plate 12, a first intermediate portion 217 extending from the bottom portion 218, a second intermediate portion 219 extending from the first intermediate portion 217, and a top portion 220 extending from the second intermediate portion 219. The top portion defines an open top end 232 surrounded by a brim 236, also sized to cause a negligible reduction of the flow of the fluid exiting the primary member 346 216 upon compression. Each portion 217, 218, 219, 220 has a closed perimeter formed by one or more walls 122. Each portion 217, 218, 219, 220 has an inner surface 123, 124, 125, 125 and an outer surface 127, 128, 129, 130 having the shape of a right frustum, and preferably a frusto-conical shape, although alternate frustum shapes are also possible, i.e. with cross-sections having a non-circular shape.

The bottom portion 218 and first intermediate portion 217 have their inner surfaces 124, 123 and their outer surfaces 128, 127 interconnected at the relatively larger ends of their frustums. The first and second intermediate portions 217, 219 have their inner surfaces 123, 125 and their outer surfaces 127, 129 interconnected at the relatively smaller (i.e. radially narrower) ends of their frustums. The second intermediate portion 219 and top portion 120 have their inner surfaces 125, 126 and their outer surfaces 129, 130 interconnected at the relatively larger ends of their frustums. As such, the wall 222 of the primary member 216 has a "bellowed" shape, with two sections which bend radially outwardly at the top and bottom and with a radially inward bend intermediate these two sections. In the embodiment shown, the wall 222 of the primary member 216 has a constant thickness and the two bellow sections, i.e. the section defined by the bottom portion 218 and first intermediate portion 217 and the section defined by the second intermediate portion 219 and top portion 120, have a similar geometry. As such, in use, the two bellow section collapse at a similar rate, but require a smaller radial footprint, i.e. less radial space, to do so that the member 16 of FIG. 1 having similar dimensions.

Alternately, the thickness of the wall 222 can vary across the height of the primary member 216. Although the portions 217, 218, 219, 220 are shown as having similar heights, alternately their heights can be different. The junction between the second intermediate portion 219 and the top portion 120 could also define a different width than that of the junction between the bottom portion 218 and the first intermediate portion 217. Thus, if the two bellow sections have different geometrical designs, they can be made to collapse at varying rates. This could provide for better energy management from low to high energy within one design. In this type of design, the secondary member 240, for example extending up to below the junction between the intermediate portions 217, 219, acts as a third energy managing member.

The shock absorbing elements 14, 114, 214 thus allow for the management of both linear and angular accelerations and, through the presence of the secondary member 40, 140, 240 the management of multiple impact levels. The geometry of the shock absorbing element 14, 114, 214 provides for a controlled collapse, which increases predictability of its behavior. The integrally molded shock absorbing elements 14, 114, 214 and base plate 12 may facilitate manufacturing operations. The shock absorbing layer 10 can be optimized for a particular application through distribution of the shock absorbing elements 14, 114, 214 on the base plate 12 and sizing of the individual shock absorbing elements 14, 114, 214 which may or may not have a same size, and may or may not have the same configuration.

The embodiments of the invention described above are intended to be exemplary. Those skilled in the art will therefore appreciate that the foregoing description is illustrative only, and that various alternate configurations and modifications can be devised without departing from the spirit of the present invention. Accordingly, the present invention is intended to embrace all such alternate configurations, modifications and variances which fall within the scope of the appended claims.

The invention claimed is:

1. A shock absorbing layer for a helmet, the layer comprising:
   a base plate; and
   a plurality of spaced apart shock absorbing members disposed on the base plate and interconnected only therethrough, each of the shock absorbing members being independently and elastically collapsible to at least partially absorb an impact load on the helmet, the shock absorbing members being hollow and defining a closed perimeter wall extending upwardly from the base plate to an open top end sized to cause negligible reduction of fluid flow exiting the shock absorbing member, the closed perimeter wall of each said shock absorbing member including at least one wall section, each wall section having:
   a first portion having opposed inner and outer surfaces each having the shape of a frustum, and
   a second portion extending upwardly from the first portion and being integrally formed therewith, the second portion having opposed inner and outer surfaces each having the shape of a frustum,
   wherein the inner surfaces of the first and second portions are interconnected through relatively radially wider ends of their respective frustums to define an inner angle between the inner surfaces of the first and second portions of less than 180 degrees, and the outer surfaces of the first and second portions are interconnected through relatively radially wider ends of their respective frustums to define an outer angle between the outer surfaces of the first and second portions of greater than 180 degrees.

2. The shock absorbing layer as defined in claim 1, wherein each of the shock absorbing members is a primary shock absorbing member, and further comprising a secondary shock absorbing member independently extending upwardly from the base plate and disposed within the closed perimeter wall of each said primary shock absorbing member, the secondary shock absorbing members being independently collapsible.

3. The shock absorbing layer as defined in claim 2, wherein the secondary member is hollow and has a circular cross-section.

4. The shock absorbing layer as defined in claim 2, wherein the secondary shock absorbing members have a smaller height away from the base plate than that of the primary shock absorbing members.

5. The shock absorbing layer as defined in claim 1, wherein the outer surfaces of the first and second portions and the inner surfaces of the first and second portions are relatively oriented such that the member includes a continuous tubular portion of material extending from the base plate to the open end when the shock absorbing member is uncompressed.

6. The shock absorbing layer as defined in claim 1, wherein the shock absorbing members include a brim circumscribing the open end of the closed perimeter wall and extending radially therefrom.

7. The shock absorbing layer as defined in claim 1, wherein each said shock absorbing member includes a plurality of ribs extending at least one of radially outwardly and radially inwardly from the closed perimeter wall, the ribs extending from the base plate to the open top end.

8. The shock absorbing layer as defined in claim 1, wherein each of the shock absorbing members has a single one of said wall sections, the first portion of said wall section extending upwardly from the base plate and the second portion of said wall section defining the open top end of the shock absorbing member.

9. The shock absorbing layer as defined in claim 1, wherein each of the shock absorbing members has at least two of said wall sections with a first one of the sections extending upwardly from the base plate and a second one of the sections extending upwardly from the first one of the sections and defining the open top end, adjacent ones of the inner surfaces of the first and second sections being interconnected through relatively radially narrower ends of their respective frustums, and adjacent ones of the outer surfaces of the first and second sections being interconnected through relatively radially narrower ends of the respective frustum.

10. The shock absorbing layer as defined in claim 1, wherein each of the shock absorbing members has a height defined from the base plate to the open end and a maximum width defined at the connection between the first and second portions of the wall section, the height being at least equal to the maximum width.

11. The shock absorbing layer as defined in claim 1, wherein the inner and outer surfaces each have a frusto-conical shape.

12. A shock absorbing layer for a helmet, the shock absorbing layer comprising:
    a base plate;
    a plurality of spaced apart and independently collapsible primary shock absorbing members being hollow and having a closed perimeter wall extending from the base plate to an open top end sized to cause negligible reduction of fluid flow exiting each primary shock absorbing member, the closed perimeter wall defining at least one wall section having a radially outwardly bent shape which forms a diverging-converging wall profile defining radially narrower upper and lower ends and a radially wider center portion, the radially wider center portion of the wall section forming a maximum width of the primary shock absorbing member disposed at a location between the open top end thereof and the base plate; and
    a secondary shock absorbing member extending from the base plate within the closed perimeter wall of each said primary shock absorbing member and acting independently from the primary shock absorbing member.

13. The shock absorbing layer as defined in claim 12, wherein the secondary shock absorbing members has a smaller height than that of the primary shock absorbing member.

14. The shock absorbing layer as defined in claim 12, wherein the secondary shock absorbing member is hollow and defines a closed perimeter wall having a different shape from that of the primary shock absorbing layer.

15. The shock absorbing layer as defined in claim 14, wherein the secondary shock absorbing member is tubular and has a circular cross-section.

16. The shock absorbing layer as defined in claim 12, wherein the primary and secondary shock absorbing members are elastically deflectable.

17. The shock absorbing layer as defined in claim 12, wherein the at least one wall section of the closed perimeter wall of the primary shock absorbing member includes:
    a first portion having opposed inner and outer surfaces each having the shape of a frustum, and
    a second portion extending upwardly from the first portion and being integrally formed therewith, the second portion having opposed inner and outer surfaces each having the shape of a frustum,
    wherein the inner surfaces of the first and second portions are interconnected through relatively radially wider ends of their respective frustums to define an inner angle between the inner surfaces of the first and second portions of less than 180 degrees, and the outer surfaces of the first and second portions are interconnected through relatively radially wider ends of their respective frustums to define an outer angle between the outer surfaces of the first and second portions of greater than 180 degrees.

18. The shock absorbing layer as defined in claim 12, wherein the at least one wall section defines two sections each having said radially outwardly bent shape and being integrally formed and stacked one on top of the other, the at least one wall section defining a radially inward bend between the two sections.

19. The shock absorbing layer as defined in claim 12, wherein the base plate, primary shock absorbing members and secondary shock absorbing members are integrally formed such that the layer is monolithic.

20. The shock absorbing layer as defined in claim 12, wherein each wall section of the primary shock absorbing member has a bottom portion and a top portion disposed on respective opposite sides of the radially wider center portion, with inner wall surfaces of the bottom and top portions extending at an angle of less than 180 degrees from one another.

21. The shock absorbing layer as defined in claim 12, wherein the closed perimeter wall includes a continuous tubular portion of material extending from the base plate to the open end when the shock absorbing member is uncompressed.

22. The shock absorbing layer as defined in claim 12, wherein the primary shock absorbing members include a brim circumscribing the open end of the closed perimeter wall and extending radially therefrom.

23. The shock absorbing layer as defined in claim 12, wherein the primary shock absorbing members include a plurality of ribs extending from the base plate to the open top end, the ribs projecting at least one of radially outwardly and radially inwardly from the closed perimeter wall.

24. The shock absorbing layer as defined in claim 12, wherein each of the primary shock absorbing members defining a height defined from the base plate to the open end thereof, the height being greater than or equal to said maximum width.

25. A protective helmet comprising an outer shell and a shock absorbing layer as defined in claim 1.

26. A protective helmet comprising:
    an outer shell; and
    a shock absorbing layer including a base plate and a plurality of spaced apart and independently acting hollow shock absorbing members which are elastically collapsible to at least partially absorb an impact load on the helmet, the shock absorbing members extending from an outer surface of the base plate and interconnected only through the base plate, said shock absorbing members having an open top end located adjacent an inner surface of the outer shell and sized to cause negligible reduction of flow of fluid exiting the hollow member, the shock absorbing members including a closed perimeter wall having at least one wall section, each said wall section having a first portion with opposed inner and outer surfaces each having the shape of a frustum, a second portion extending upwardly from the first portion having opposed inner and outer surfaces each having the shape of a frustum, and wherein the inner surfaces of the first and second portions are interconnected through relatively larger ends of their respective frustums, and the outer surfaces of the first and second portions being interconnected through relatively larger ends of their respective frustums.

\* \* \* \* \*